United States Patent [19]
Johnson

[11] Patent Number: 5,212,739
[45] Date of Patent: May 18, 1993

[54] NOISE TOLERANT OPTICAL CHARACTER RECOGNITION SYSTEM

[75] Inventor: Dan S. Johnson, Greeley, Colo.

[73] Assignee: Hewlett-Packard Company, Palo Alto, Calif.

[21] Appl. No.: 875,000

[22] Filed: Apr. 24, 1992

Related U.S. Application Data

[63] Continuation of Ser. No. 599,522, Oct. 17, 1990, abandoned.

[51] Int. Cl.$^5$ .............................................. G06K 9/00
[52] U.S. Cl. ...................................... 382/9; 382/25; 382/26; 382/22
[58] Field of Search .................. 382/9, 16, 21, 22, 14, 382/26, 19, 23, 25

[56] References Cited

U.S. PATENT DOCUMENTS

| | | | |
|---|---|---|---|
| 4,764,973 | 8/1988 | O'Hair | 382/14 |
| 4,860,376 | 8/1989 | Tanka | 382/9 |
| 4,972,499 | 11/1990 | Kurosawa | 382/9 |
| 5,025,481 | 6/1991 | Ohuchi | 382/53 |

OTHER PUBLICATIONS

Cederberg, R.L.T., "Images to Outlines, Chain Link Coding and Segmentation for Raster Scan Devices", *Computer Graphics and Image Processing*, vol. 10, No. 3, 1979, pp. 224–234.

Gonzales and Sklansky, "Fast Polygonal Approximation of Digitized Curves", *Pattern Recognition*, vol. 12, 1981, pp. 327–331.

Duda, Richard O. and Hart, Peter E., *Pattern Classification and Scene Analysis*, John Wiley & Sons, 1973, Chapters 2–6.

*Primary Examiner*—Michael T. Razavi
*Assistant Examiner*—Yon Jung

[57] ABSTRACT

Disclosed is a method of optical character recognition that first segments a graphical page image into word images. The method obtains a set of features by extracting smaller outlines of the dark regions in the word images, and then further dissecting each of the smaller outlines into small sections called micro-features. Micro-features are simply sections of character outlines, therefore, they can easily be extracted from the outlines of an entire word without any knowledge about character segmentation boundaries. Micro-features are extracted from an outline by finding the local extremities of the outline and then defining a micro-feature between each pair of sequential extremities. Once extracted, the micro-features are compared to micro-features from an ideal character in order to classify a character, and convert it into a character code.

13 Claims, 16 Drawing Sheets

NOISE TOLERANT OPTICAL CHARACTER RECOGNITION SYSTEM

This is a continuation of copending application Ser. No. 07/599,522 filed on Oct. 17, 1990, now abandoned.

FIELD OF THE INVENTION

This invention relates to pattern recognition systems and more particularly to computerized pattern recognition systems. Even more particularly, the invention relates to computerized optical character recognition systems.

BACKGROUND OF THE INVENTION

Optical character recognition, or OCR, is the process of transforming a graphical bit image of a page of textual information into a text file wherein the text information is stored in a common computer processable format, such as ASCII. The text file can then be edited using standard word processing software.

In the process of transforming each of the characters on the page from a graphical image into an ASCII format character, prior art OCR methods first break the graphical page image into a series of graphical images, one for each character found on the page. They then extract the features of each character and classify the character based on those features. If the characters on the page are of a high quality, such as an original typed page, simple processing methods will work well for the process of converting the characters. However, as document quality degrades, such as through multiple generations of photocopies, carbon copies, facsimile transmission, or in other ways, the characters on a page become distorted causing simple processing methods to make errors. For example, a dark photocopy may join two characters together, causing difficulty in separating these characters for the OCR processing. Joined characters can easily cause the process that segments characters to fail, since any method which depends on a "gap" between characters cannot distinguish characters that are joined. Since the feature extraction and character classification parts of the process assume that the segmentation was done correctly, they will give erroneous results on joined characters.

Light photocopies produce the opposite effect. Characters can become broken, and appear as two characters, such as the character "u" being broken in the bottom middle to create two characters, each of which may look like the "i" character. Also, characters such as the letter "e" may have a segment broken to cause them to resemble the character "c".

Early prior art OCR methods did not extract character features from a character, instead they simply compared a graphical bit map of the character to a template bit map of a known character. This method was commonly called "matrix matching". One problem with matrix matching is that it is very sensitive to small changes in character size, skew, shape, etc. Also, this technology was not "omni font", that is, it had to be carefully trained on each type font to be read and would not generalize easily to new type fonts.

To solve the "omni font" problem, prior art methods begin to extract higher level features from a character image. The goal was to select a set of features which would be insensitive to unimportant differences, such as size, skew, presence of serifs, etc., while still being sensitive to the important differences that distinguish between different types of characters. High level features, however, can be very sensitive to certain forms of character distortion. For example, many feature extractors detect the presence of "closures", such as in the letters "e", "o", "b", "d", etc., and the feature extractors use this information to classify the character. Unfortunately, a simple break in a character can easily cause a closure to disappear, and the feature extractor method that depends on such closures would probably classify the character incorrectly.

Often the high level feature representation of a character contains very few features. Therefore, when a feature is destroyed, such as a break in a closure, there is insufficient information left to correctly classify the character.

There is need in the art then for an optical character recognition system that classifies characters by creating a set of features that is insensitive to character segmentation boundaries. There is further need in the art for such a system that creates features having a low enough level to be insensitive to common noise distortions. Another need in the art is for such a system that creates a sufficient number of features that some will remain to allow character classification even if others are destroyed by noise. A still further need in the art is for such a system that provides a set of features that are insensitive to font variations. The present invention meets these needs.

SUMMARY OF THE INVENTION

It is an aspect of the present invention to provide a system for recognizing textual characters from a bit image of a page of text.

It is another aspect of the invention to define a set of micro-features for each of the words on the page of text.

Another aspect is to define such a set of micro-features that can be extracted from a word without prior knowledge about character segmentation boundaries.

Another aspect is to define such a set of micro-features that are at a low enough level that they are insensitive to common noise distortions.

Yet another aspect is to define such a set of micro-features for each character within a word so that if a few micro-features are destroyed by noise, the remaining features will still be sufficient to yield a correct classification.

A further aspect of the invention is to provide a set of micro-features that are at a high enough level that they are insensitive to font variations, such as size, shape, skew, etc.

The above and other objects of the invention are accomplished in a method of optical character recognition that first segments a page image into word images. Since words nearly always have at least one space character between them, separation of words is far simpler than separating individual characters. By separating the page image into words, the method postpones decisions about character segmentation until more information is available to help make the character segmentation decision. This additional information is obtained by extracting features from the entire word and then performing character segmentation and classification as a single integral process. The method obtains a set of features by extracting the outlines of the dark regions in a word image, and then further dissecting each outline into small sections called micro-features. Since micro-features are simply sections of character outlines, they can easily be extracted from the outlines of an entire word without any knowledge about character segmentation boundaries. The invention extracts micro-features from an outline by finding the local extremities of an outline and then defining a micro-feature between each pair of sequential extremities. Once extracted, the micro-features are compared to micro-features from an ideal character in order to classify a character, and convert it into a character code.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
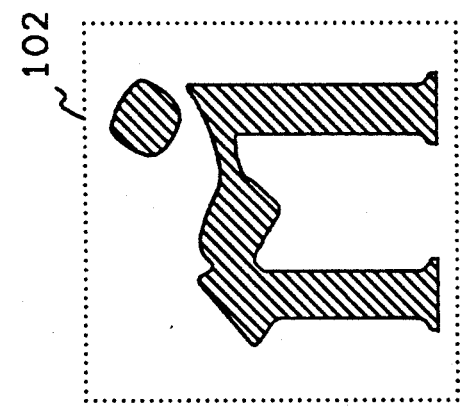
FIG. 1 shows an example of character distortions that commonly occur because of noise and illustrates the problems solved by the present invention.
Figure 1:
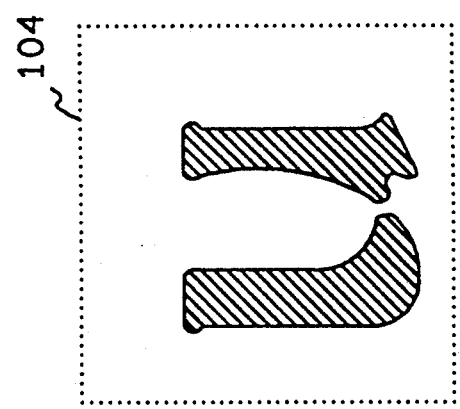
Figure 1:
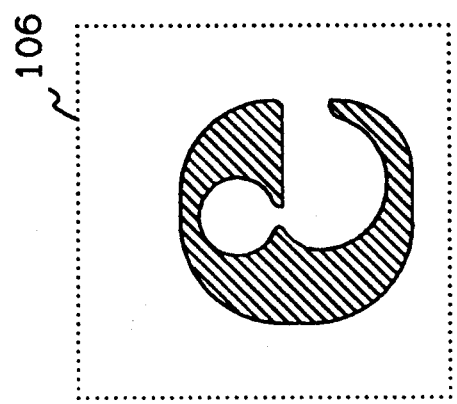

FIG. 1 shows an example of character distortions that commonly occur because of noise and illustrates the problems solved by the present invention. Referring now to FIG. 1, the characters enclosed by the dashed outline 102 are the characters "r" and "i" which have been "joined" because of noise, as might occur for example, by a dark photocopy. Prior art methods which depend on a gap between characters would fail to detect these as two characters, and would probably classify them as the single character "n". The character within the dashed outline 104 is the character "u" which has been broken because of noise such as might be caused by a light photocopy. Prior art algorithms which rely on a gap between characters would probably treat this as two characters, and probably classify it as the two characters "ii". A light photocopy of the character "e" could also result in the outline enclosed in the dashed line 106. This type of noise distortion might cause prior art methods to classify this character as a "c".

To solve the character classification problems defined by the characters of FIG. 1, the present invention uses a new method of optical character recognition that first segments a page image into word images. Since the segmenter in the present invention is only required to isolate words, not individual characters, the segmenter can use very simple methods. Since words nearly always have at least one space character between them, segmentation of words is far simpler than separating individual characters. By segmenting the page image into words, the method postpones decisions about character segmentation until more information is available to help make the character segmentation decision. This additional information is obtained by extracting features from the entire word and then performing character segmentation and classification as a single integral process.

For example, in the example "ri" 102, the features on the left side of the this simple word might "vote" strongly that the word contains an "r", while the features on the right side of the word might "vote" strongly for an "i". (The description of FIG. 3 better defines the term "vote"). This information could then be used to decide where the proper character segmentation boundary exists. In order for this method to perform effectively, appropriate features must be chosen to characterize the characters, and these features must be independent of character segmentation boundaries. For example, character width, height, or height/width ratio would not be appropriate because they assume that the method is operating on a properly segmented character. Nearly all high level character features suffer from this disadvantage.

Figure 2:
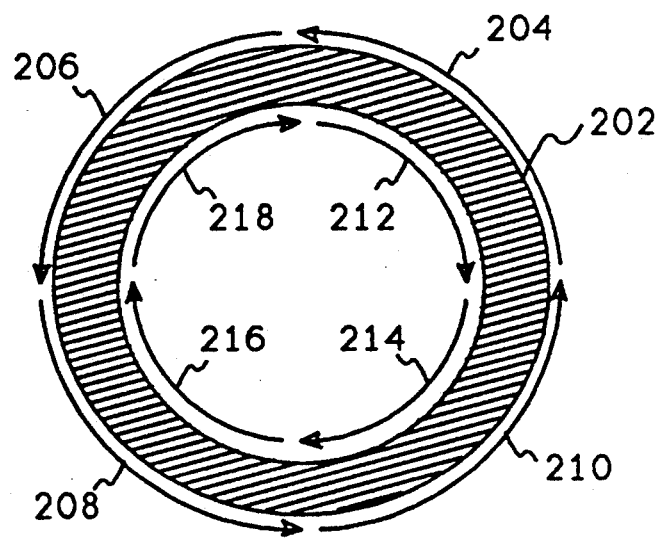
FIG. 2 shows a set of micro-features that would be extracted from a lower case letter "o"

The method of the present invention obtains a set of features by extracting the outlines of the "black" regions in a word image, and then further dissecting each outline into small sections called micro-features. FIG. 2 shows a diagram of a lower case "o" and its corresponding micro-features. Referring now to FIG. 2, a "black" region 202 forms a lower case "o" character. Eight micro-features extracted from the area 202 are indicated by arrows 204, 206, 208, 210, 212, 214, 216, and 218. The method of the present invention for extracting these micro-features will be described below in more detail with respect to FIGS. 9 through 18. In general, a micro-feature is extracted by starting at a local extremity of an outline, for example, the highest or lowest point of an outline, and moving in a direction that would keep the dark area of the outline to the left until another extremity, for example, a far left or right region is encountered.

For example, the micro-feature indicated by arrow 206 starts with an extremity at the top of the region 202, and proceeds in a direction that keeps the region 202 to the left until the extremity at the far left side of the region 202 is encountered. The other seven micro-features are extracted in the same manner.

Figure 3:
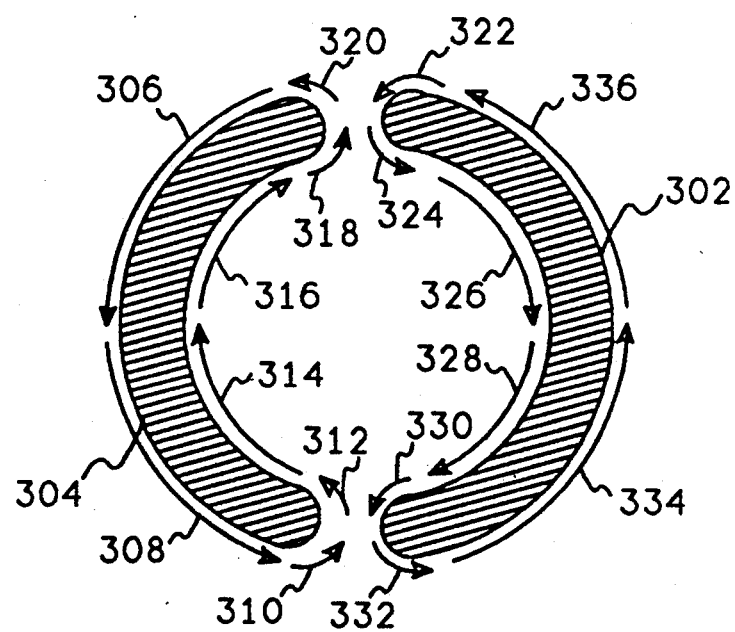
FIG. 3 shows the micro-features that would be extracted from a first noise-distorted lower case letter "o"

FIG. 3 shows the micro-features that would be extracted from a noise distorted lower case letter "o". Referring now to FIG. 3, the letter "o" has two "black" areas 302 and 304 with a break down the center of the letter "o". This type of distortion is common with multiple generation photocopies, facsimile transmission, and more often occurs in fonts which have thinner regions at the top and bottom of letters. Eight micro-features 306, 308, 334, 336, 326, 328, 314, and 316 are Very similar to the micro-features shown in FIG. 2. Eight additional micro-features 310, 312, 318, 320, 322, 324, 330, and 332 have also been extracted from the broken letter "o". However, this latter set of micro-features, because of their smaller size would have a lower "vote" in the classification method, resulting in a higher probability that this character would be classified as a "o".

Figure 4:
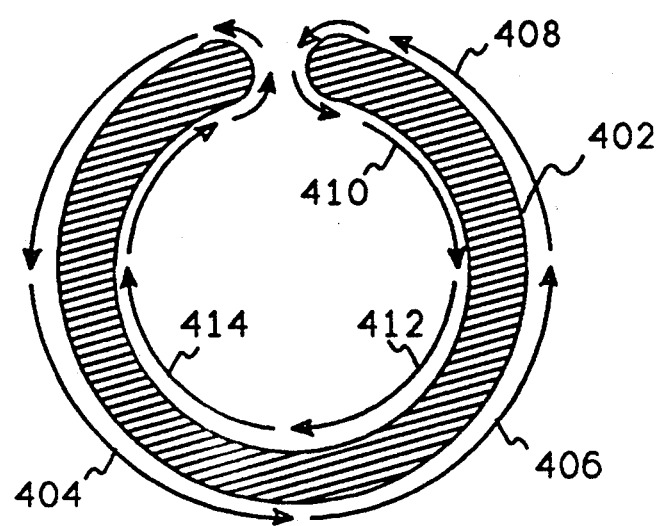
FIG. 4 shows the micro-features that would be extracted from a second noise-distorted lower case letter "o"

FIG. 4 shows the micro-features that would be extracted from a second noise distorted lower case letter "o". Referring now to FIG. 4, a "black" area 402 has a single break in the top left section of the lower case "o". However, six of the micro-features found in the undistorted letter of FIG. 2 are still present in the distortion of FIG. 4. Those six micro-features are indicated by arrows 404, 406, 408, 410, 412, and 414. Therefore, seventy-five percent of the micro-features from an undistorted character are present in the distortion of FIG. 4, which would give a high probability that the character would be correctly recognized.

Figure 5:
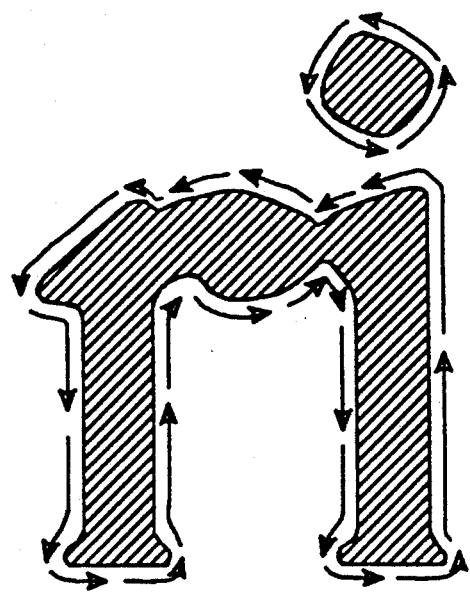
FIG. 5 shows the micro-features that would be extracted from the two lower case letters "r" and "i"
Figure 6:
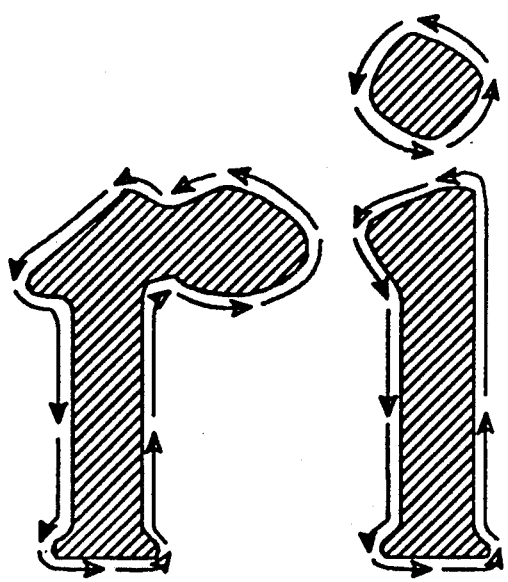
FIG. 6 shows the micro-features that would be extracted from a noise distorted combination of the letters "r" and "i"

Since micro-features are simply sections of character outlines, they can easily be extracted from the outlines of an entire word without any knowledge about character segmentation boundaries. FIG. 5 shows the micro-features that would be extracted from of the two lower case letters "r" and "i", and FIG. 6 shows the micro-features that would be extracted from a noise distorted combination of the lower case letters "r" and "i". Referring now to FIGS. 5 and 6, it can be seen that the micro-features, as represented by small arrows, extracted from the separated letters in FIG. 5 are virtually the same as the micro-features extracted from the combined letters of FIG. 6. The number of the micro-features extracted is identical, however, four of the micro-features in FIG. 6 have a different length and shape from four of the micro-features of FIG. 5. Since a total of twenty-four features have been extracted, over eighty percent (80%) of the micro-features are identical in both extractions.

Figure 7:
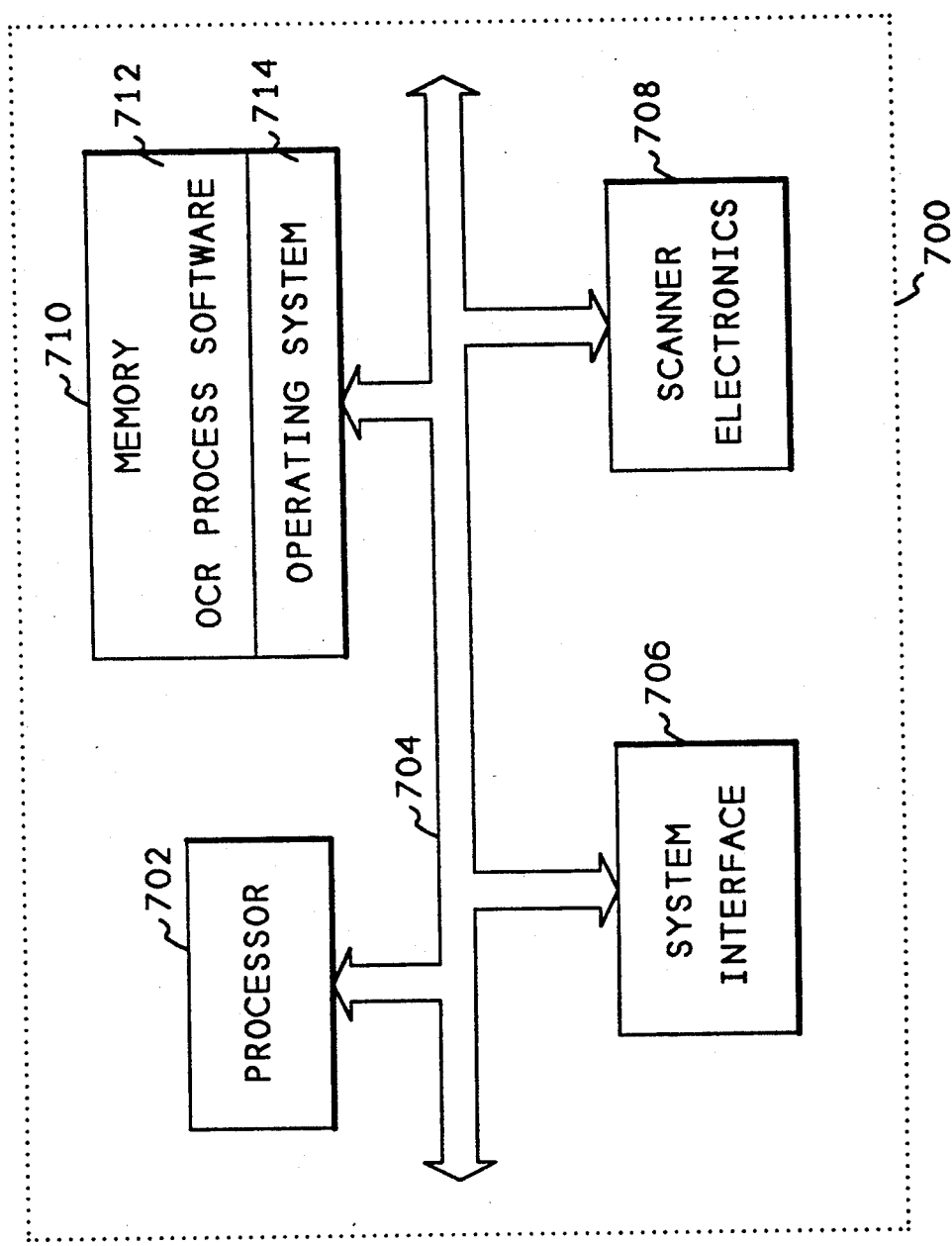
FIG. 7 shows a block diagram of the hardware of the present invention.

FIG. 7 shows a block diagram of the hardware of the present invention. Referring now to FIG. 7, a scanning device 700 contains a processor 702 which communicates to other elements of the scanning device 700 over a system bus 704. A system interface 706 allows the device 700 to communicate to a computer in order to transfer the text file to the computer after the scanning process is complete. Scanner electronics 708 scan a page of textual information and produce a graphical bit image of the contents of the page. Memory 710 contains the OCR process software 712 of the present invention which uses an operating system 714 to communicate to the scanner electronics 708 and the system interface 706. The OCR process 712 reads the pixels of the graphical bit image from the scanner electronics 708 and processes that image according to the method of the present invention.

Figure 8:
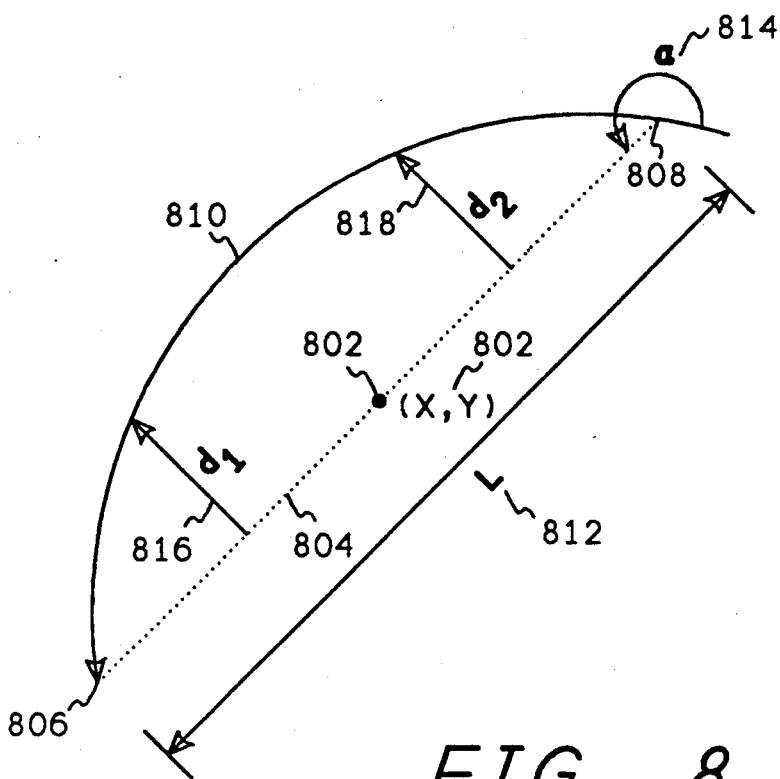
FIG. 8 shows a diagram of the parameters of a micro-feature.

The method of the present invention extracts micro-features from an outline by finding the local "extremities" of an outline and then defining a micro-feature between each pair of sequential extremities. Once extracted, a micro-feature is described by six parameters, as shown in FIG. 8. When extracting micro-features, outlines are always traversed keeping "black" pixels on the left. Alternatively, outlines could be traversed keeping the "black" pixels on the right. Although either method will work correctly, the same method must be used in all instances.

Figure 8A:
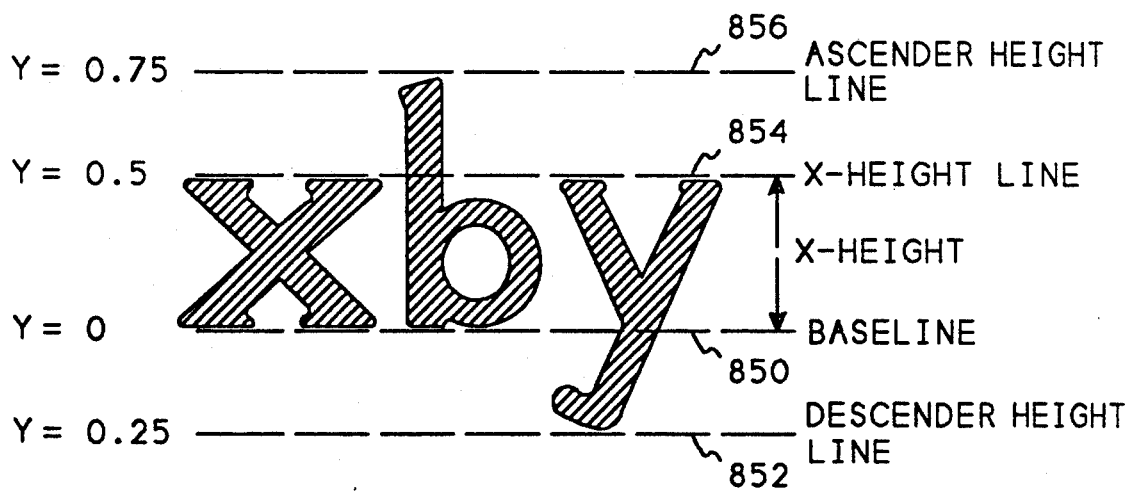
FIG. 8A shows a diagram of the coordinate system used to normalize a character.

FIG. 8 shows a diagram of the parameters of a micro-feature and FIG. 8A shows a diagram of the coordinate system used to normalize features within a word. The six parameters of a micro-feature are: the center position of the straight line approximation of the micro-feature expressed as X-Y coordinates, the length of the straight line approximation of the micro-feature, the angular direction of the straight line approximation of the micro-feature, and two measurements of the deviation of the micro-feature from its straight line approximation.

Referring now to FIG. 8, a center position 802 is located on the straight line approximation 804 of the micro-feature. The center position 802 is defined located mid-way between the two endpoints 806 and 808 of the micro-feature 810. The center position 802 is defined using X-Y coordinates, where Y is the vertical distance of the midpoint to the baseline of the text, and X is the horizontal distance from the center of the word.

Referring now to FIG. 8A, the coordinate system used to normalize all features within a word has four reference lines: a baseline 850 which is the Y coordinate of the bottom of characters such as "a", "e", "o", etc., a descender height line 852 which is the Y coordinate of the bottom of characters such as "y", "g", "p", etc., the X height line 854 which is the top of lower case letters such as "x", "a", etc., and an ascender height line 856 which is the top of characters such as "b", "h", "A", etc. The baseline 850 for all characters will always have a Y coordinate of zero. The descender height line 852 will be scaled to have a Y coordinate of $-0.25$, the X height line 854 will be scaled to have a Y coordinate of 0.5, and the ascender height line 856 will be scaled to have a Y coordinate of 0.75. By normalizing the characters in this manner, all font size and line skew variations are removed.

Referring back to FIG. 8, the L parameter 812 is the length of the straight line approximation 804 between the endpoints 806 and 808 of the micro-feature 810. The angle alpha ($\alpha$) 814 is the angular direction of the straight line approximation 804 of the micro-feature 810. Alpha is a number between zero and one, where zero corresponds to zero degrees (0°), which is an eastward direction on the diagram, and one corresponds to 360°.

The two deviation parameters, $d_1$ 818 and $d_2$ 816 are measurements of the deviation of the micro-feature 810 from its straight line approximation 804. $d_1$ 818 is the distance from the straight line approximation 804 at the point on the straight line which is one third ($\frac{1}{3}$) of the distance from the starting point 808 to the ending point 806. $d_2$ 816 corresponds to the distance from the straight line approximation 804 to the micro-feature 810 at a point two thirds ($\frac{2}{3}$) the distance from the starting point 808 to the ending point 806 on the straight line approximation 804. $d_1$ 818 and $d_2$ 816 will be positive numbers if the micro-feature 810 is to the left of the straight line approximation 804, and they will be negative numbers if the micro-feature 810 is oriented to the right of the straight line approximation 804. Also, the lengths $d_1$ and $d_2$ are scaled by the length L 812 of the micro-feature, so that the parameters are independent of the length of the micro-feature.

The X coordinates of the micro-features are readjusted after all the micro-features in a word have been extracted. After all the micro-features in a word have been extracted, the weighted average of the X-positions of all the micro-features, where the weight is the length of the micro-feature, is computed and this position is made the X origin. The X-positions of all the micro-features are then normalized to this origin. The effect of this normalization is that the X origin will be approximately at the center of the word.

This normalization might appear to cause a problem with the method, since the X origin, and therefore the X-positions of all the micro-features, will change depending on the character segmentation boundary chosen. The X-parameter, however, is the only parameter that behaves in this fashion. All other parameters are independent of the character segmentation boundary chosen. Also, the X-parameter can easily be re-normalized once a segmentation boundary for a character is chosen. Therefore, all other parameters except the X-parameter are used to do a preliminary classification of the micro-features, and based on these preliminary results, a character segmentation boundary is chosen and the X-parameters are re-normalized and then used to perform a full classification of the character.

Figure 9:
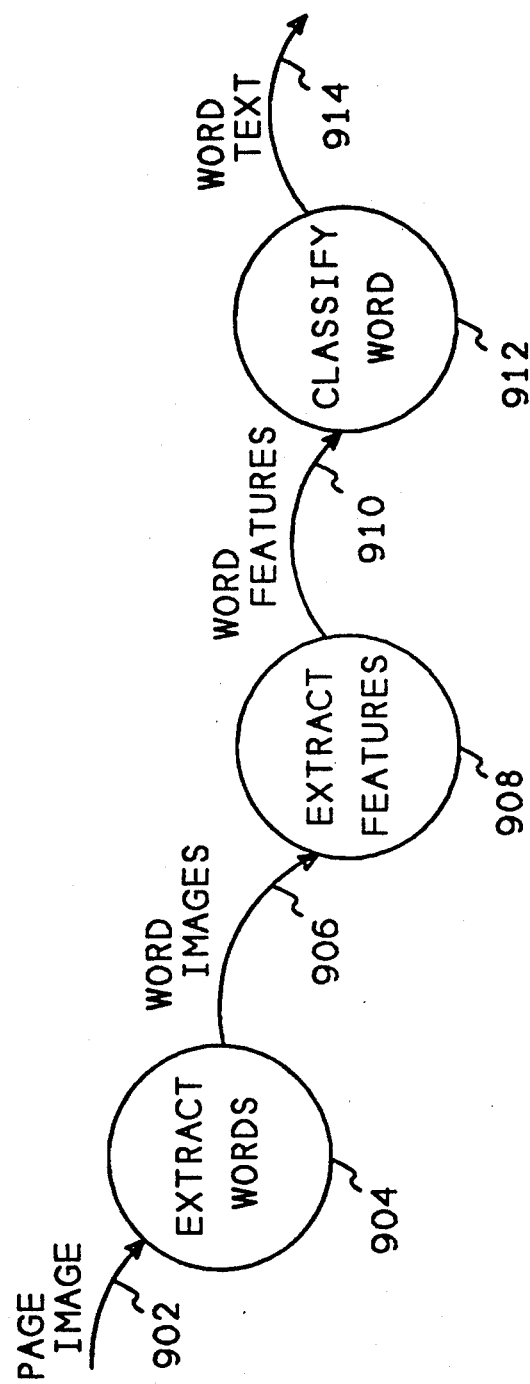
FIG. 9 shows a flow diagram of the overall process of the present invention.

FIG. 9 shows a flow diagram of the overall process of the present invention. Referring now to FIG. 9, a page image 902 is received from the scanner electronics 708 (FIG. 7). This page image is processed by an extract words process 904 which identifies each individual word on a page and places that word into a word image data stream 906. Because words are ordinarily completely surrounded by white space on a page, the extraction of words is a very simple process, well known in the art. A more complete description of this process can be found in "Images to Outlines, Chain Link Coding and Segmentation for Raster Scan Devices", R. L. T. Cederberg, *Computer Graphics and Image Processing*, Volume 10, Number 3, 1979, pp 224–234, and "Fast Polygonal Approximation of Digitized Curves", Gonzales and Sklansky, *Pattern Recognition*, Volume 12, 1981, pp327-331. The word images 906 are sent to an extract features process 908 of the present invention. The extract features process 908 will be described in detail with respect to FIGS. 10 through 18. The extract features process 908 creates a list of word features 910 which is sent to a classify word process 912. The classify word process then classifies each character within a word and produces a text data file 914. A more complete description of the classify word process can be found in *Pattern Classification and Scene Analysis*, Richard O. Duda and Peter E. Hart, John Wiley and Sons, 1973, Chapters 2 through 6. The following is a description of the terminology used in the description of FIGS. 10 through 18.

X-height. The distance, in page coordinate units or pixels, from the baseline of the line of text to the top of lower case characters, for the current line of text being processed.

Baseline-at(11). A function that returns the Y position, in page coordinate units or pixels, of the bottom of the characters in the current line of text being processed, at the specified X position.

Outline. The boundary between "black" and "white" for a group of connected "black" pixels. An outline always forms a closed loop and no outline crosses itself. The micro-feature extractor always takes as input a set of outlines which describe a word.

Edge point. A single point on an outline.

Segment. The straight line representation of an outline between two adjacent edge points. A segment may contain multiple pixels.

Extremity. A local minima or maxima of an outline in the X or Y directions. Horizontal or vertical flat segments in the outline are also extremities, since they could become extremities in the presence of noise or skew. Extremities of the outline act as the end points for the micro-features being extracted.

Section. A set of sequential segments in an outline that all have approximately the same orientation. That is, the segments along any straight portion of an outline will form a section, since all the segments will have the same "orientation".

Figure 10:
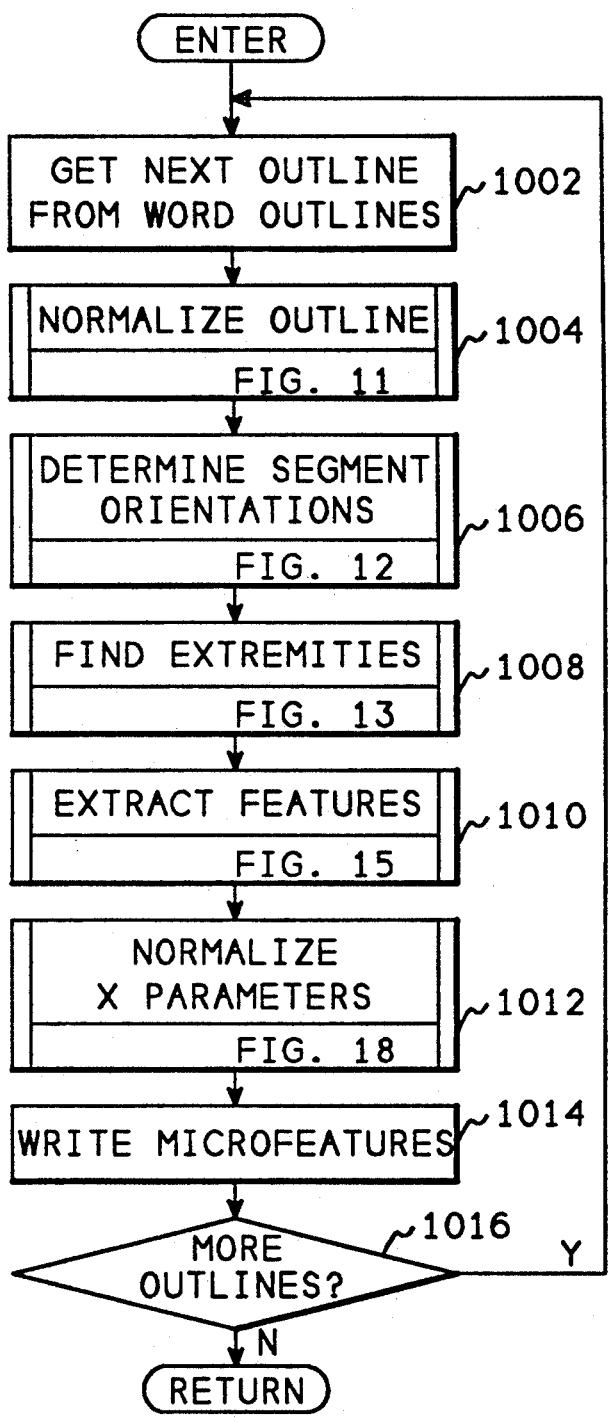
FIG. 10 shows a top-level flowchart of the extract features process of FIG. 9.

FIG. 10 shows a top level flowchart of the extract features process 908 (FIG. 9). Referring now to FIG. 10, after entry, block 1002 gets the next outline from the word images dataflow 906. Block 1004 calls FIG. 11 to normalize this outline, and block 1006 calls FIG. 12 to determine segment orientations for all segments within the outline. Block 1008 calls FIG. 13 to find the extremities of the outline, and block 1010 calls FIG. 15 to extract the micro-features from the outline. Block 1012 then calls FIG. 18 to normalize the X-parameters in the word, and block 1014 writes the micro-features to the word features dataflow 910 (FIG. 9) to pass them on to the classify word process 912. Block 1016 then determines whether there are more outlines within the word, and if there are, transfers back to block 1002 to get the next outline. After all outlines have been processed, block 1016 returns to its caller.

Figure 11:
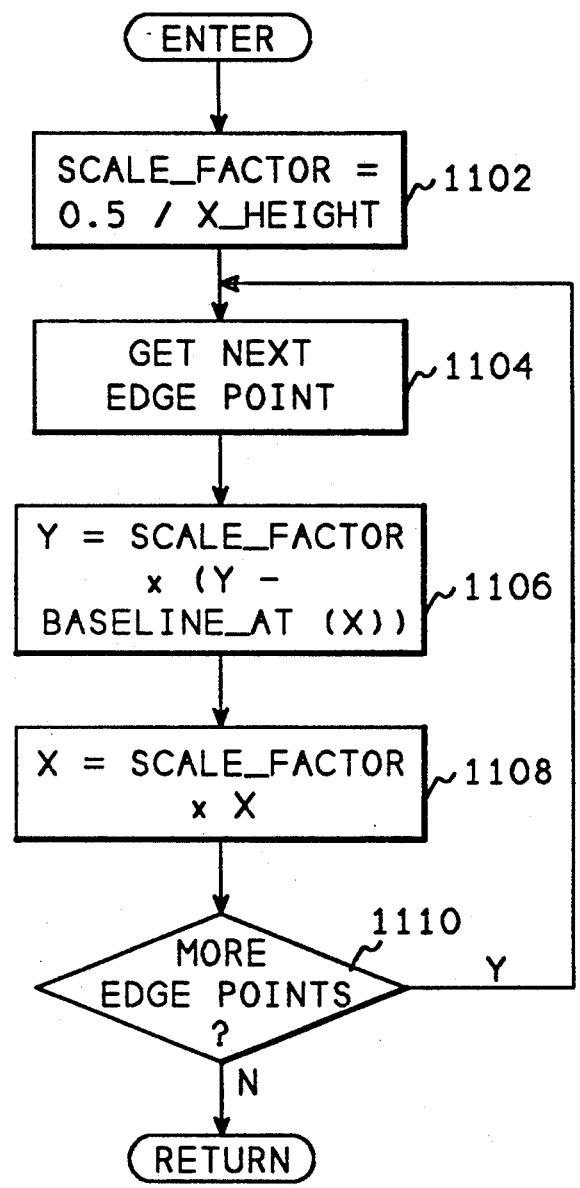
FIG. 11 shows a flowchart of the normalize outline function called by FIG. 10.

FIG. 11 shows a flowchart of the normalize outline function called by FIG. 10. Referring now to FIG. 11, after entry, block 1102 sets the scale_factor to 0.5 divided by the X height of the word image. Block 1104 then gets the next edge point from the outline and block 1106 sets the Y coordinate of the edge point to the scale_factor multiplied by the current Y value minus the baseline_at(x). Block 1108 then sets the X coordinate of the edge point to the scale_factor multiplied by the current X coordinate. Block 1110 then determines whether there are more edge points in the outline and if there are returns to block 1104 to process the next edge point. After all edge points have been processed, block 1110 returns to FIG. 10.

Figure 12:
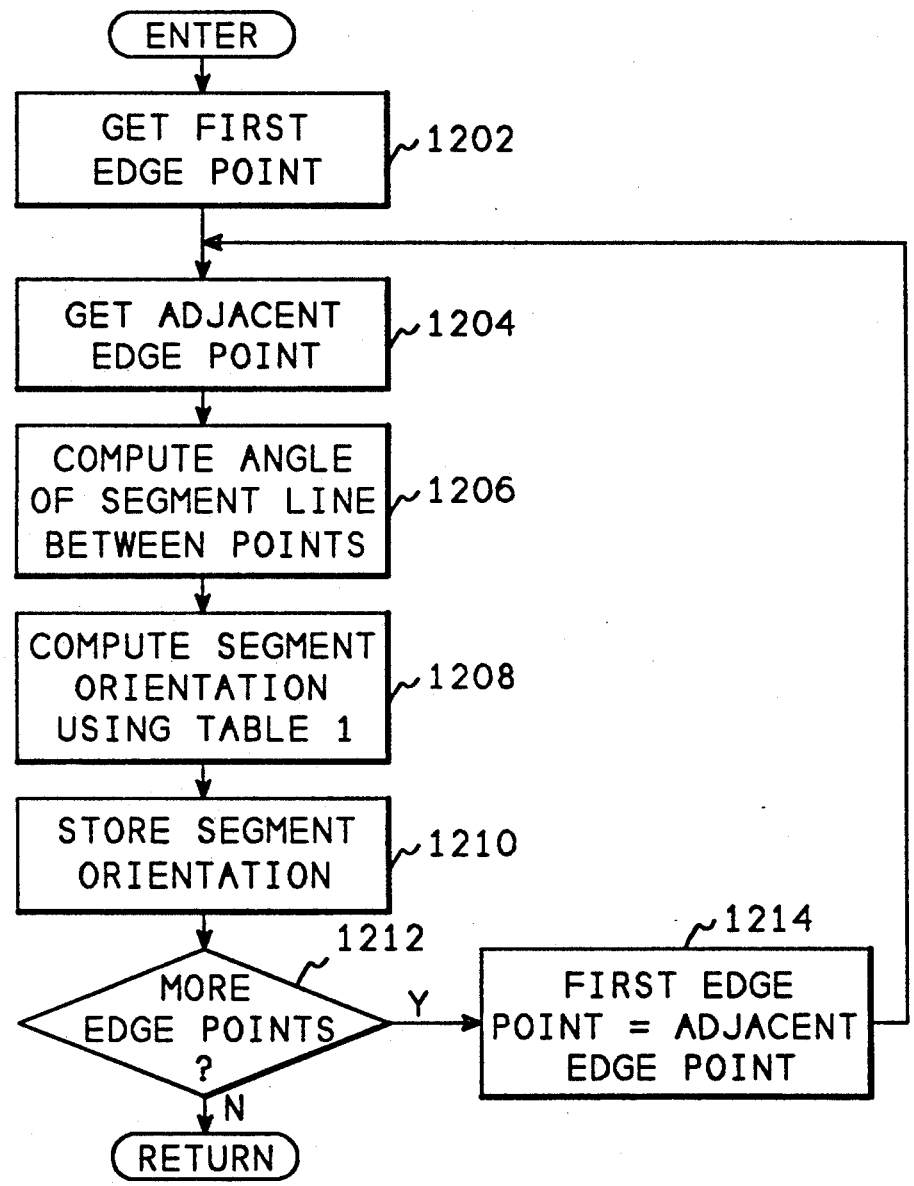
FIG. 12 shows a flowchart of the determine segment orientations function called by FIG. 10.

FIG. 12 shows a flowchart of the determine segment orientation function called from block 1006 of FIG. 10. Referring now to FIG. 12, after entry, block 1202 gets the first edge point from the outline. Block 1204 then gets an adjacent edge point and block 1206 computes the angle of a segment line between the two points. Block 1208 then computes the segment orientation using Table 1. Table 1 shows the range of angular degrees for each of the segment orientations. For example, all segments with an angle greater than or equal to 350° and less than 10° will be classified as having a segment orientation of east. After computing the segment orientation, block 1210 stores the segment orientation for use by the next process. Block 1212 then determines if there are more edge points. If there are more edge points, block 1212 transfers to block 1214 which copies the adjacent edge point used in the last computation to the first edge point for the next computation and then returns to block 1204 to get the next adjacent edge point. After all edge points have been processed, block 1212 returns to FIG. 10.

Figure 13:
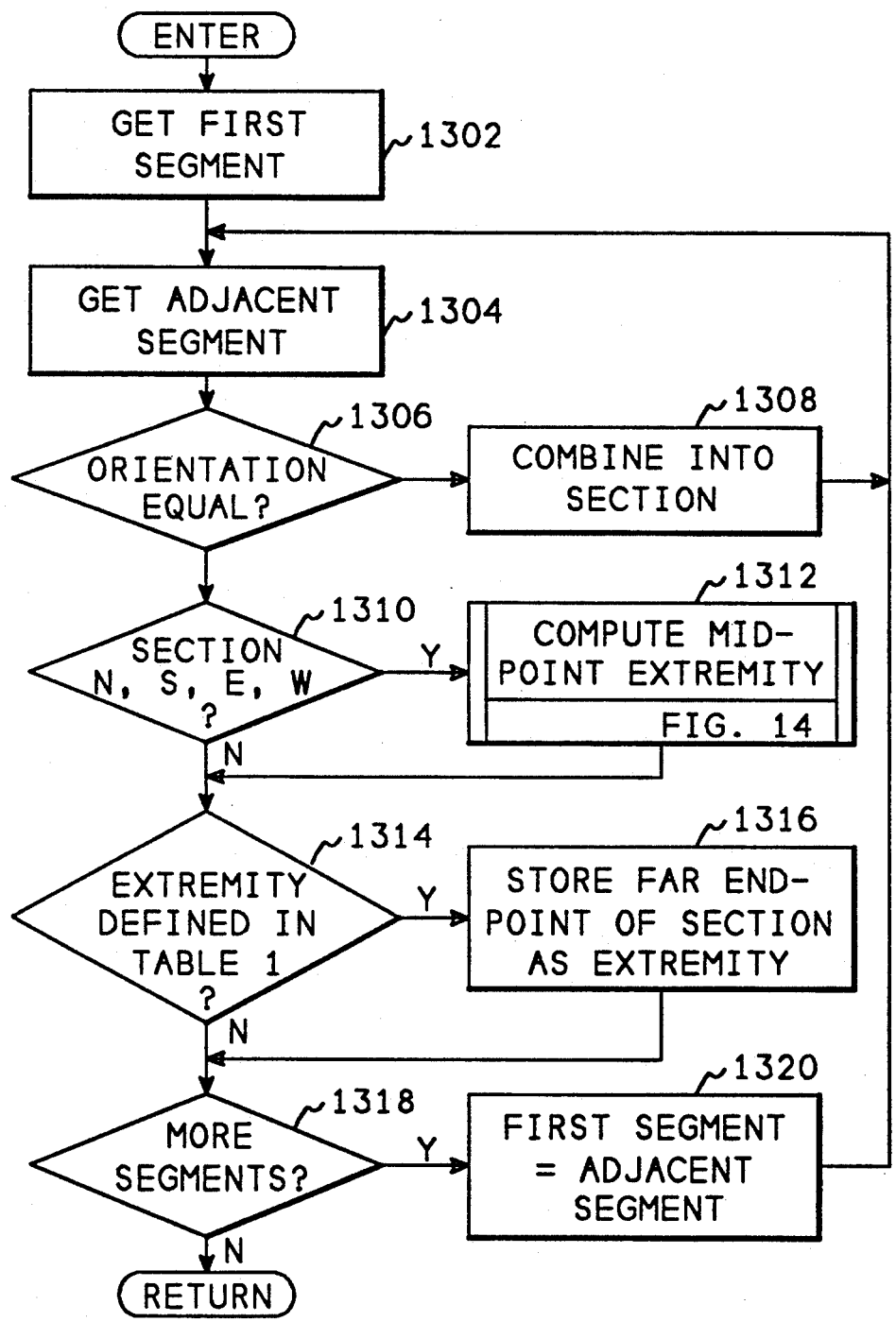
FIG. 13 shows a flowchart of the find extremities function called by FIG. 10.

FIG. 13 shows a flowchart of the find extremities function called in block 1008 of FIG. 10. Referring now to FIG. 13, after entry, block 1302 gets the first segment that was created by the determine segment orientations function of FIG. 12. Block 1304 then gets an adjacent segment and block 1306 determines whether the segments have the same orientation. If the segments have the same orientation they will be combined into a section, therefore, block 1306 transfers to block 1308 which performs the combination and then transfers back to 1304 to get the next adjacent segment. This continues until an adjacent segment is obtained that has a different orientation. When a segment having a nonequal orientation is encountered, block 1306 transfers to block 1310 which determines whether the section, combined from the previous segments, has an orientation of north, south, east, or west. If the section orientation is one of the primary directions, then the section is considered to be horizontal or vertical and its midpoint will become an extremity. Block 1310 then transfers to block 1312 which calls FIG. 14 to compute the midpoint and assign it as an extremity. If the section has any other orientation, or after computing the midpoint extremity, control transfers to block 1314 which accesses Table 2 to determine whether the end of the section is an extremity. Table 2 shows the eight possible orientations along its left side and along its top. The orientations along the left refer to the current section. The orientations along the top of Table 2 refer to the next section that is adjacent to the current section. If the word YES occurs at the intersection, then the endpoint of the current section becomes an extremity. For example, if a section having an east orientation is followed by a section having a northwest orientation, then the intersection of those two sections is an extremity of the outline. If the extremity is defined in Table 2, block 1314 transfers to block 1316 which stores the far endpoint of the current section as an extremity. After the extremity is determined, or if an extremity was not defined in Table 2, control transfers to block 1318 which determines whether there are more segments in the outline. If there are more segments, block 1318 transfer to block 1320 which moves the adjacent segment to the first segment and then returns to block 1304, otherwise block 1318 returns to FIG. 10.

Figure 14:
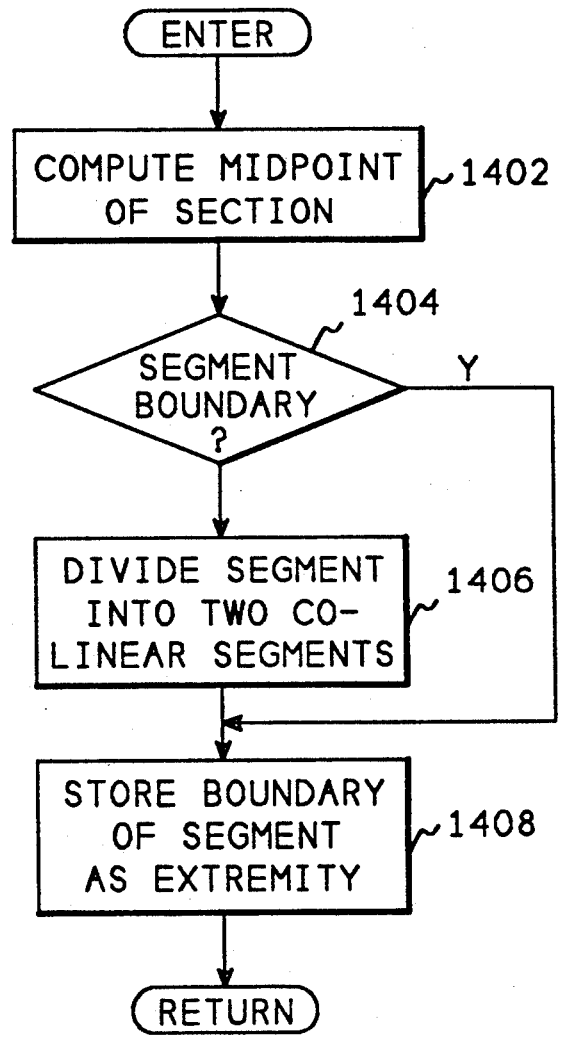
FIG. 14 shows a flowchart of the compute midpoint extremity function called by FIG. 13.

FIG. 14 shows a flowchart of the compute midpoint extremity function called from FIG. 13. Referring now to FIG. 14, after entry, block 1402 computes the midpoint of the section and then block 1404 determines whether this midpoint is at the boundary of one of the segments within the section. If the midpoint is not at a segment boundary, block 1404 transfers to block 1406 which divides the segment containing the midpoint into two collinear segments so that the midpoint will be at the boundary between the two segments. After dividing the segments, or if the midpoint was already at a segment boundary, block 1408 stores this boundary as an extremity of the outline and then returns to FIG. 13.

Figure 15:
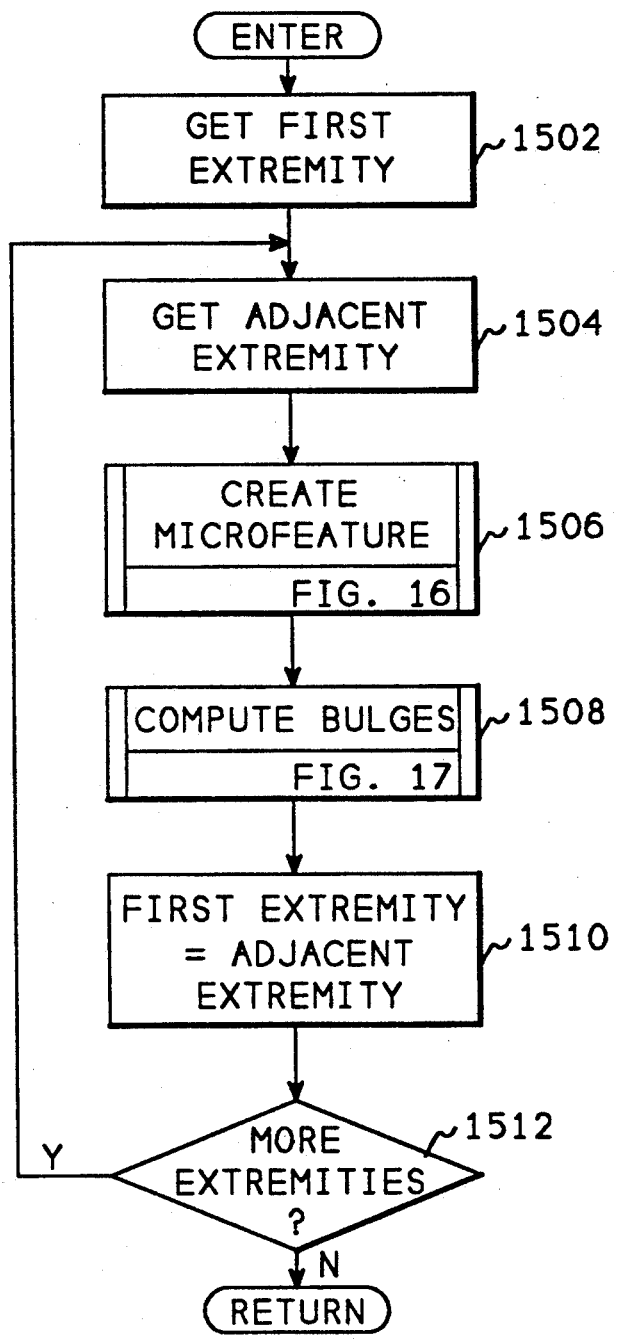
FIG. 15 shows a flowchart of the extract features function called by FIG. 10.

FIG. 15 shows a flowchart of the extract features function called by block 1010 of FIG. 10. Referring now to FIG. 15, after entry, block 1502 gets the first extremity that was created by FIG. 13. Block 1504 then gets the next adjacent extremity and block 1506 calls FIG. 16 to create a micro-feature. Block 1508 then calls FIG. 17 to compute the bulges, that is, parameters $d_1$ and $d_2$ as shown in FIG. 8, of the micro-feature. Block 1510 then copies the second extremity retrieved in block 1504 to the first extremity, and block 1512 determines whether there are more extremities. If there are more extremities, block 1512 returns to block 1504 to repeat the process, otherwise block 1512 returns to FIG. 10.

Figure 16:
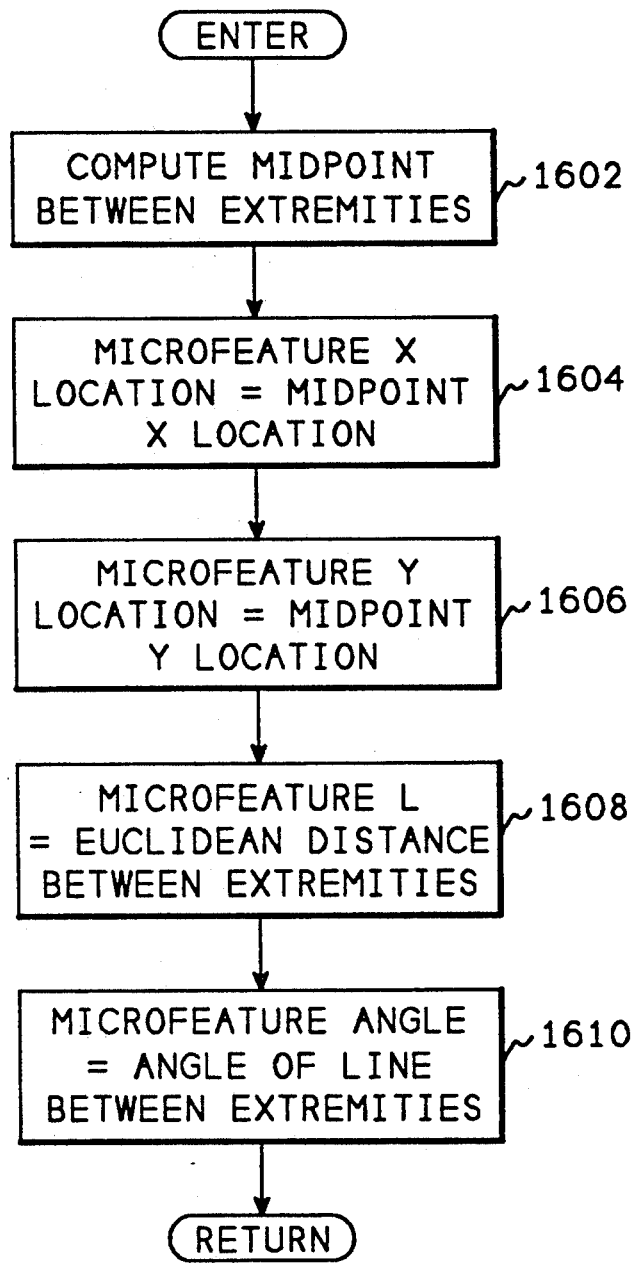
FIG. 16 shows a flowchart of the create micro-feature function called by FIG. 15.

FIG. 16 shows a flowchart of the create micro-feature function called by FIG. 15. Referring now to FIG. 16, after entry, block 1602 computes the midpoint between the two extremities. Block 160 then sets the X value for the location of the micro-feature equal to the X coordinate of the midpoint location and block 1606 sets the micro-feature Y coordinate location equal to the Y location of the midpoint. Block 1608 then sets the micro-feature L parameter equal to the Euclidian distance between the two extremities. Block 1610 then sets the angle alpha ($\alpha$) of the micro-feature equal to the angle of the line from the first extremity to the second extremity. FIG. 16 then returns to FIG. 15.

Figure 17:
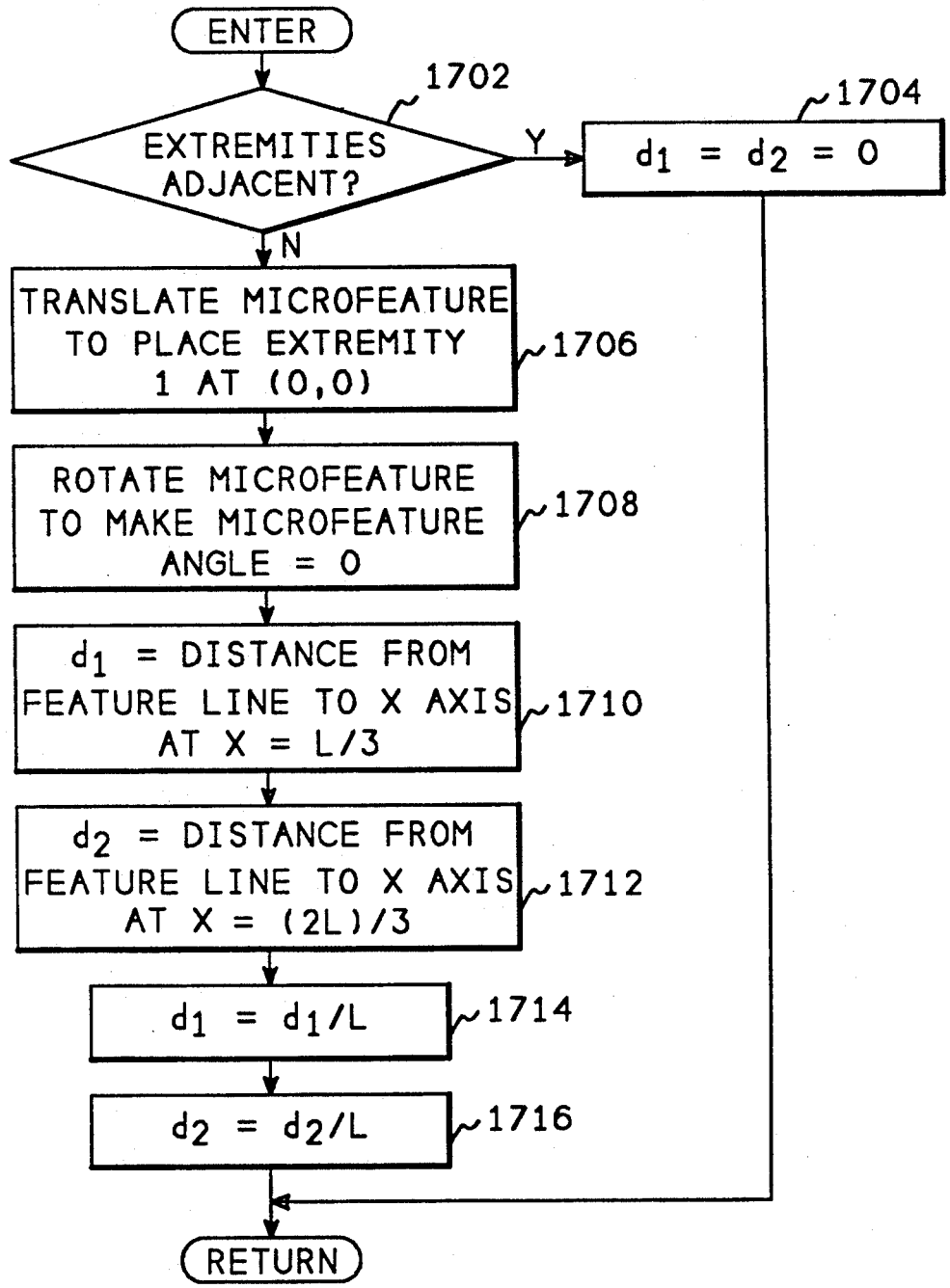
FIG. 17 shows a flowchart of the compute bulges function called by FIG. 15.

FIG. 17 shows a flowchart of the compute bulges function called by FIG. 15. Referring now to FIG. 17, after entry, block 1702 determines whether the extremities of the micro-feature are adjacent. If the extremities are adjacent, block 1702 transfers to block 1704 which sets both the $d_1$ and $d_2$ bulge parameters to zero before returning to FIG. 15. If the extremities are not adjacent, block 1702 transfers to block 1706 which translates the micro-feature to place the first extremity at location (0,0) and block 1708 rotates the micro-feature to make the micro-feature angle $\alpha$ equal to zero. Block 1710 then computes the distance $d_1$ as the distance from the feature to the X axis at the point where X equals L divided by three ($X = L/3$). That is, the distance between the feature and the X axis one third ($\frac{1}{3}$) of the way from the first extremity to the second extremity of the micro-feature. Block 1712 then computes the value of $d_2$ as the distance from the feature to the X axis at the location of X equal to two L divided by three ($X = 2L/3$). That is, $d_2$ is the distance from the X axis to the feature at the location two thirds ($\frac{2}{3}$) of the way from the first extremity to the second extremity. The values for $d_1$ and $d_2$ will be positive if the feature is above the X axis and these values will be negative if the feature is below the X axis. Block 1714 then normalizes the value of $d_1$ to make it relative to the length of the micro-feature and block 1716 normalizes the value of $d_2$ to make it relative to the length of the micro-feature before returning to FIG. 15.

Figure 18:
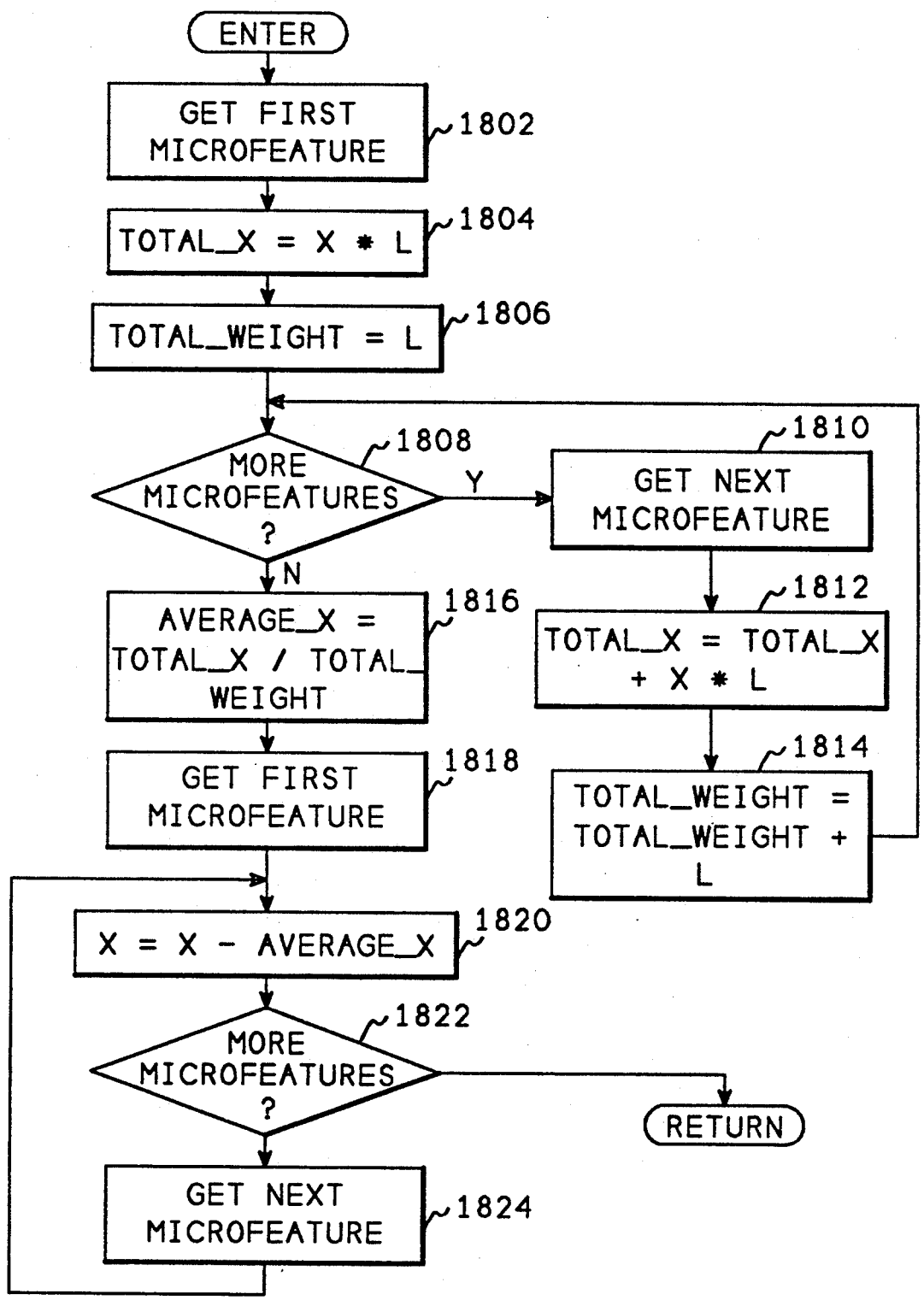
FIG. 18 shows a flowchart of the normalize X parameters function called by FIG. 10.

FIG. 18 shows a flowchart of the normalize X parameters function called by FIG. 10. Referring now to FIG. 18, after entry, block 1802 gets the first micro-feature and block 1804 creates the initial value of a parameter total_X to be equal to the X parameter of this micro-feature multiplied by the length of micro-feature. Block 1806 then creates an initial value for the total_weight parameter as the value of L for the first micro-feature. Block 1808 then determines whether there are additional micro-features, and if there are, block 1808 transfers to block 1810 which gets the next micro-feature. Block 1812 then multiplies the X coordinate by its length and adds this value to the value of total_X. Block 1814 adds the length of the new micro-feature to the total_weight parameter. Block 1814 then returns to block 1808 and this loop continues for all micro-features. After all micro-features have been processed, block 1808 transfers to block 1816 which computes the average X value by dividing the total_X value by the total_weight value computed in the blocks above. Block 1818 then gets the first micro-feature again and block 1820 subtracts the average_X value from the X of the micro-feature. Block 1822 determines whether there are more micro-features and if there are, block 1824 gets the next micro-feature before transferring back to block 1820 to adjust its X value. This loop continues until the X parameters of all micro-features have been processed at which time FIG. 18 returns to FIG. 10.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Segment Angle | Segment Orientation |
|---|---|
| > = 350 < 010 | E |
| > = 010 < 080 | NE |
| > = 080 < 100 | N |
| > = 100 < 170 | NW |
| > = 170 < 190 | W |
| > = 190 < 260 | SW |
| > = 260 < 280 | S |
| > = 280 < 350 | SE |

TABLE 2

| Current Section | Orientation of the Next Section | | | | | | | |
|---|---|---|---|---|---|---|---|---|
| | N | S | E | W | NE | NW | SE | SW |
| N | | YES | | | | | YES | YES |
| S | YES | | | | YES | YES | | |
| E | | | | YES | | YES | | YES |
| W | | | YES | | YES | | YES | |
| NE | | YES | YES | | | YES | YES | YES |
| NW | YES | YES | | YES | | | YES | YES |
| SE | YES | | | YES | YES | YES | | YES |
| SW | YES | | YES | | YES | YES | YES | |

What is claimed is:

1. A system for optical character recognition comprising:
   means for converting a page having plurality of text printed thereon into a graphical image containing a plurality of pixel elements representative of said text;
   means for separating said graphical image into a plurality of word images;
   means for scanning said word images and for producing a plurality of micro-features for each of said word images comprising
      means for separating said word images into a plurality of outlines each defined by a boundary between pixels of different intensity within said word images,
      means for locating all extremities of each of said outlines, comprising
         means for combining each pair of adjacent edge points of said outlines into a plurality of segments,
         means for computing a directional orientation for each of said segments,
         means for combining adjacent segments having the same directional orientation into a plurality of sections, and
         means for defining zero or more points in each of said sections as an extremity, and
      means for producing a single micro-feature between each pair of said extremities, said micro-feature being terminated at each of said pair of extremities; and
   means for converting said micro-features into a set of coded characters equivalent to said word.

2. The system of claim 1 wherein said means for defining zero or more points in a segment as extremities comprises:
   means for defining a midpoint of all horizontal and vertical sections as an extremity; and
   means for defining an end point of selected sections as an extremity.

3. The system of claim 1 wherein said means for producing a micro-feature further comprises means for scaling said micro-feature to produce a normalized micro-feature.

4. The system of claim 1 wherein said micro-feature comprises:
   a length measured as a straight distance between said extremities;
   a center point located at a center of said line between said extremities;
   an angle measured from a horizontal direction to said line between said extremities;
   zero or more bulge lengths, measured from said line between said extremities to said outline.

5. The system of claim 4 wherein said zero or more bulge lengths comprises two bulge lengths measured at points one-third and two-thirds the distance between said extremities.

6. A system for optical character recognition comprising:
   means for converting a page having plurality of text printed thereon into a graphical image containing a plurality of pixel elements representative of said text;
   means for separating said graphical image into a plurality of group images, each said group image having one or more character images;
   means for scanning said group images and for producing a plurality of micro-features for each of said group images comprising
      means for operating said group image into a plurality of outlines each defined by a boundary between pixels of different intensity within said group image,
      means for locating all extremities of each of said outlines, comprising
         means for combining each pair of adjacent edge points of said outlines into a plurality of segments,
         means for computing a directional orientation for each of said segments,
         means for combining adjacent segments having the same directional orientation into a plurality of sections, and means for defining zero or more points in each of said sections as an extremity, and means for producing a single micro-feature between each pair of said extremities, said micro-feature being terminated at each of said pair of extremities; and means for converting said micro-features into a set of coded characters each equivalent to one of said character images in said group image.

7. The system of claim 6 wherein said means for defining zero or more points in a segment as extremities comprises:

means for defining a midpoint of all horizontal and vertical sections as an extremity; and means for defining an end point of selected sections as an extremity.

8. The system of claim 6 wherein said means for producing a micro-feature further comprises means for scaling said micro-feature to produce a normalized micro-feature.

9. The system of claim 6 wherein said micro-feature comprises:

a length measured as a straight distance between said extremities;

a center point located at a center of said line between said extremities;

an angle measured from a horizontal direction to said line between said extremities;

zero or more bulge lengths, measured from said line between said extremities to said outline.

10. The system of claim 9 wherein said zero or more bulge lengths comprises two bulge lengths measured at points one-third and two-thirds the distance between said extremities.

11. A method for optical character recognition comprising the steps of:

(a) converting a page having plurality of text printed thereon into a graphical image containing a plurality of pixel elements representative of said text;

(b) separating said graphical image into a plurality of group images;

(c) scanning said group images to produce a plurality of micro-features for each of said group images comprising the steps of (c1) separating said group image into a plurality of outlines each defined by a boundary between edge points within said group image, (c2) locating all extremities of each of said outlines, comprising the steps of (c2A) combining each pair of adjacent pixels of said outlines into a plurality of segments;

(c2B) computing a directional orientation for each of said segments;

(c2C) combining adjacent segments having the same directional orientation into a plurality of sections; and (c2D) defining zero or more points in each of said sections as an extremity, and (c3) producing a single micro-feature between each pair of said extremities, said micro-feature being terminated at each of said pair of extremities; and (d) converting said micro-features into a set of coded characters each equivalent to a character within said group.

12. The method of claim 11 wherein step (c2D) further comprises the steps of:

(c2D1) defining a midpoint of all horizontal and vertical sections as an extremity; and (c2D2) defining an end point of selected sections as an extremity.

13. The method of claim 11 further comprising the step of scaling said micro-feature to produce a normalized micro-feature.

* * * * *